United States Patent
Väisänen et al.

(10) Patent No.: US 7,415,247 B1
(45) Date of Patent: Aug. 19, 2008

(54) METHOD AND ARRANGEMENT FOR TRANSMITTING AND RECEIVING RF SIGNALS THROUGH VARIOUS RADIO INTERFACES OF COMMUNICATION SYSTEMS

(75) Inventors: Risto Väisänen, Salo (FI); Kim Kaltiokallio, Salo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/856,746

(22) PCT Filed: Nov. 25, 1999

(86) PCT No.: PCT/FI99/00974

§ 371 (c)(1),
(2), (4) Date: May 24, 2001

(87) PCT Pub. No.: WO00/31885

PCT Pub. Date: Jun. 2, 2000

(30) Foreign Application Priority Data

Nov. 26, 1998 (FI) .................................. 982559

(51) Int. Cl.
*H04B 1/40* (2006.01)
(52) U.S. Cl. .................... 455/76; 455/234.1; 455/307
(58) Field of Classification Search .............. 455/552.1, 455/324, 323, 118, 127.4, 76, 232.1, 234.1, 455/266, 313, 127.1, 127.2, 110, 112, 127.3, 455/84, 553.1, 90.2, 234.2, 140, 307, 260, 455/334, 339, 340, 341; 375/350
See application file for complete search history.

(56) References Cited

U.S. PATENT DOCUMENTS

| | | | |
|---|---|---|---|
| 4,395,776 A | 7/1983 | Naito et al. ................ 455/119 |
| 5,483,691 A * | 1/1996 | Heck et al. ................ 455/234.2 |
| 5,511,235 A * | 4/1996 | Duong et al. ............... 455/266 |
| 5,564,076 A * | 10/1996 | Auvray ........................ 455/76 |
| 5,694,414 A * | 12/1997 | Smith et al. ................. 455/307 |
| 5,758,271 A * | 5/1998 | Rich et al. ................ 455/234.1 |
| 5,794,119 A | 8/1998 | Evans et al. .................. 455/6.2 |
| 5,796,772 A * | 8/1998 | Smith et al. ............. 455/552.1 |
| 5,825,809 A * | 10/1998 | Sim ........................... 375/350 |
| 5,896,562 A | 4/1999 | Heinonen .................... 455/76 |

(Continued)

FOREIGN PATENT DOCUMENTS

EP 0581573 A1 2/1994

(Continued)

OTHER PUBLICATIONS

Behzad Razavi, RF Microelectronics, 1998, Prentice Halls, Inc., 10th Edition, pp. 150-153.*

(Continued)

*Primary Examiner*—Lana Le
(74) *Attorney, Agent, or Firm*—Banner & Witcoff, Ltd.

(57) ABSTRACT

A method and an arrangement for transmitting and receiving RF signals, associated with different radio interfaces of communication systems, employ a direct conversion based transceiver which substantially comprises one receive signal branch and one transmit signal branch. Mixing frequencies of the different systems are generated by a single common synthesizer by use of an output frequency divider in combination with the synthesizer, and by use of filtering corresponding to a system channel bandwidth by means of a controllable low-pass filter operating at baseband frequency.

23 Claims, 2 Drawing Sheets

U.S. PATENT DOCUMENTS

| | | | | |
|---|---|---|---|---|
| 5,926,749 A | * | 7/1999 | Igarashi et al. | 455/127.2 |
| 5,926,750 A | * | 7/1999 | Ishii | 455/324 |
| 5,953,641 A | * | 9/1999 | Auvray | 455/552.1 |
| 6,029,052 A | * | 2/2000 | Isberg et al. | 455/323 |
| 6,151,354 A | * | 11/2000 | Abbey | 455/140 |
| 6,256,511 B1 | * | 7/2001 | Brown et al. | 455/552.1 |
| 6,308,050 B1 | * | 10/2001 | Eklof | 455/76 |
| 6,484,038 B1 | * | 11/2002 | Gore et al. | 455/552.1 |
| 6,954,624 B2 | * | 10/2005 | Hamalainen | 455/127.3 |

FOREIGN PATENT DOCUMENTS

| | | |
|---|---|---|
| EP | 0631400 | 12/1994 |
| EP | 0633674 A2 | 1/1995 |
| EP | 0653851 A2 | 5/1995 |
| EP | 0798880 A3 | 10/1997 |
| EP | 0800283 | 10/1997 |
| EP | 0809366 A3 | 11/1997 |
| EP | 0813312 A2 | 12/1997 |
| WO | WO 99/01933 | 1/1999 |

OTHER PUBLICATIONS

Proof of publication date (Nov. 6, 1997) of book Razavi, Behzad, RF Microelectronics, Prentice Hall, 1st edition by amazon.com under product detail section, and and paper of when it was received by USPTO (Nov. 23, 1998).*

"Software Radio: Technology & Implementation", ICCT'98, Weidong et al.

* Corresponds to Finnish Patent Application No. FI 100286.

* cited by examiner

METHOD AND ARRANGEMENT FOR TRANSMITTING AND RECEIVING RF SIGNALS THROUGH VARIOUS RADIO INTERFACES OF COMMUNICATION SYSTEMS

BACKGROUND OF THE INVENTION

The invention relates to a method and arrangement for transmitting and receiving RF signals associated with various radio interfaces of communication systems. The invention finds particular utility in transceivers of general-purpose mobile stations.

Mobile communication systems are developing and expanding rapidly which has lead to a situation in which there are in many areas systems complying with several different standards. This has brought about a need for mobile stations that can be used in more than one system. Good examples are the digital systems called GSM (Global System for Mobile communications) and DCS (Digital Cellular System), which operate on different frequency bands but have otherwise similar radio interfaces. In addition, the modulation, multiplexing and coding schemes used may be different. The systems mentioned above use the time division multiple access (TDMA) method; other methods include the frequency division multiple access (FDMA) and code division multiple access (CDMA).

One possible way of making a mobile station capable of operating in multiple systems is to have in the mobile station completely separate signal paths for each system. This, however, would lead to an unreasonable increase in the mobile station size and manufacturing costs. Therefore, the goal is to design a mobile station in which the differences relating to the radio interfaces of the various systems could be largely dealt with by means of programming, instead of having separate signal processing paths.

It is known e.g. from patent application document EP 653851 a transceiver arrangement using one local oscillator the frequency of which falls between the lower operating frequency band and the higher operating frequency band such that one and the same intermediate frequency (IF) can be used for both operating frequency bands. However, the disadvantage of such a solution is that the necessary IF stages make the implementation rather complex, and the manufacturing costs of the device will be high because of the great number of components. Furthermore, the IF stages require filters in order to eliminate spurious responses and spurious emissions. In addition, channel filtering at the intermediate frequency sets great demands on the IF filters.

In a direct-conversion, or zero-IF, receiver the radio-frequency (RF) signal is directly converted into baseband without any intermediate frequencies. Since no IF stages are needed, the receiver requires only a few components, therefore being an advantageous solution for general-purpose mobile stations which have multiple signal branches for different systems. To aid in understanding the problems relating to the direct conversion technique and prior art it is next described in more detail a prior-art solution.

FIG. 1 shows a direct conversion based arrangement for realizing a dual frequency band transceiver, known from the Finnish Patent document FI 100286. Depending on the receive frequency band, a RF signal received by an antenna is coupled by means of switch 104 either to a first receive branch (DCS) or second receive branch (GSM). If the received signal is in the DCS frequency band, it is conducted to bandpass filter 106, low-noise amplifier (LNA) 108 and bandpass filter 110. After that the signal is brought to block 112 which produces signal components having a 90-degree phase difference. The in-phase component I and quadrature component Q are further conducted by means of switches 114 and 134 to mixers 116 and 136. The mixers get their mixing signals from a DCS synthesizer 140 the frequency of which corresponds to the received carrier frequency so that the mixing produces the in-phase and quadrature components of the complex baseband signal. The baseband signal is further processed in the receive (RX) signal processing unit, block 139.

If the signal received is a GSM signal, switch 104 directs the received signal to the GSM branch which comprises, connected in series, bandpass filter 126, low-noise amplifier 128, bandpass filter 130 and phase shifter 132 which generates two signals with a mutual phase difference of 90 degrees. The signals are further conducted by means of switches 114 and 134 to mixers 116 and 136 where the mixing frequency is now determined by a signal coming from the GSM synthesizer 150 via switch 161. The signals produced by the mixers are further conducted to the baseband RX signal processing unit 139.

The DCS synthesizer comprises in a known manner a phase-locked loop (PLL) which includes a voltage-controlled oscillator (VCO) 141 the output signal of which is amplified at amplifier 146 thus producing the synthesizer output signal. The frequency of the signal from oscillator 141 is divided by an integer Y in divider 142 and the resulting signal is conducted to phase comparator 143. Similarly, the frequency of the signal generated by reference oscillator 158 is divided by an integer X in divider 144 and conducted to phase comparator 143. The phase comparator produces a signal proportional to the phase difference of said two input signals, which signal is conducted to a low-pass filter (LPF) 145 producing a filtered signal that controls the voltage-controlled oscillator 141. The phase-locked loop described above operates in a known manner in which the output frequency of the synthesizer becomes locked to the frequency coming to the phase comparator from the reference frequency branch. The output frequency is controlled by varying the divisor Y.

The GSM synthesizer 150 comprises a voltage-controlled oscillator 150, amplifier 156, dividers 152 and 154, phase comparator 153 and a low-pass filter 155. The GSM synthesizer operates like the DCS synthesizer described above, but the output frequency of the GSM synthesizer corresponds to GSM frequency bands.

In the transmitter part, a baseband complex transmit (TX) signal is processed in a TX signal processing unit wherefrom the in-phase and quadrature components of the signal are conducted to mixers 162 and 182 that produce a carrier-frequency signal by multiplying the input signal by the mixing signal. If the transmission is at the DCS frequency, switch 161 selects the DCS synthesizer's output signal as the mixing signal. The carrier-frequency signal is conducted through switch 164 to the DCS branch where a 90-degree phase shift is first produced between the in-phase component and quadrature component, and the resulting signals are then summed, block 166. The resulting DCS signal is conducted to bandpass filter 168, amplifier 170, and bandpass filter 172. The RF signal thus produced is further conducted to the antenna 102 via switch 180.

If the transmission is at the GSM frequency, the output signal of the GSM synthesizer is used as the mixing signal. The resulting carrier-frequency signal is conducted to the GSM branch in which it is processed in the same manner as in the DCS branch blocks 186, 188, 190 and 192. The RF signal thus produced is conducted to the antenna 102 via switch 180. One and the same antenna 102 can be used in both transmission and reception if the TX and RX circuits are coupled to the antenna through a duplex filter, for example. If the apparatus is designed to operate in two or more frequency bands, it needs separate filters for each frequency band.

The circuit arrangement described above has, however, some disadvantages. First, separate carrier-frequency signal branches in the receiver and in the transmitter add to the complexity, size and manufacturing costs of the transceiver. Second, each operating frequency band needs a separate synthesizer of its own.

SUMMARY OF THE INVENTION

An object of the invention is to provide a simple solution for realizing a programmable transceiver operating in a plurality of systems in such a manner that the aforementioned disadvantages related to the prior art can be avoided.

In the direct conversion based transceiver according to the invention signal processing can be performed using one and the same signal processing line regardless of the system. This is achieved using the signal processing steps set forth below.

The method according to the invention for processing signals received from different radio interfaces of communication systems is characterized in that it comprises steps in which a carrier-frequency signal is received from a radio interface,
the carrier-frequency signal is bandpass-filtered,
the filtered carrier-frequency signal is amplified,
an RX mixing signal at the receive frequency is generated,
a complex baseband signal is generated from the received carrier-frequency signal by mixing it with the RX mixing signal,
the baseband signal generated is low-pass-filtered,
the baseband signal generated is amplified,
the baseband signal is converted digital, and
the baseband signal converted digital is processed to produce an information signal encoded and modulated into the received signal.

The method according to the invention for processing signals transmitted to different radio interfaces of communication systems is characterized in that it comprises steps in which a digital baseband quadrature signal is generated on the basis of the information signal to be transmitted,
the digital baseband signal is converted analog,
a TX mixing signal at the transmit frequency is generated,
a carrier-frequency transmission signal is generated from the baseband signal by mixing it with the TX mixing signal,
the carrier-frequency signal generated is amplified, and
the transmission signal is sent to the radio interface.

The direct-conversion receiver according to the invention operating at different interfaces of communication systems is characterized in that it comprises antenna means for receiving a radio-frequency signal,
bandpass filter for filtering a carrier-frequency signal,
first RX amplifier for amplifying the filtered carrier-frequency signal,
means for generating an RX mixing signal at the receive frequency,
mixing means for generating a complex baseband signal from the received signal using the RX mixing signal,
low-pass filter for filtering the baseband signal
second amplifier for amplifying the baseband signal,
analog-to-digital converter for converting the baseband signal digital and means for processing the baseband signal converted digital to produce an information signal encoded and modulated into the received signal.

The direct-conversion transmitter according to the invention operating at different radio interfaces of communication systems is characterized in that it comprises means for generating a digital baseband quadrature signal on the basis of the information signal to be transmitted,
digital-to-analog converter for converting the baseband transmission signal analog,
synthesizer for generating a TX mixing signal at the transmit frequency,
mixing means for producing a signal at the carrier frequency from the baseband transmission signal using the TX mixing signal,
TX amplifier for amplifying the signal at the carrier frequency, and
antenna means for transmitting the amplified transmission signal at the carrier frequency.

Other preferred embodiments of the invention are described in the dependent claims.

In the present invention, signal band limiting is advantageously performed at the baseband frequency so that there is no need for "steep" filters and, therefore, system-specific filter lines. Filtering can thus be performed as low-pass filtering using a filter with a controllable cut-off frequency. This way, it is possible to completely avoid separate system-specific channel filtering circuits.

To enable the generation of mixing frequencies of the different operating frequency bands by one and the same synthesizer it is advantageously used frequency division of the synthesizer output signal. If the synthesizer's operating frequency is set higher than the frequencies used in the systems, it is possible to generate, in conjunction with the synthesizer frequency division, two mixing signals with a 90-degree phase difference, thus avoiding the need for phase shifters on the signal line and achieving a good phase accuracy.

Using the solution according to the invention it is possible to realize a general-purpose transceiver which is considerably simpler and more economical to manufacture than prior-art solutions. The circuit arrangement according to the invention requires only one TX signal branch and one RX signal branch. Moreover, one and the same synthesizer may be used to generate the mixing signals. Furthermore, there is no need for channel filters operating at the radio frequency. Therefore, the circuitry can be easily integrated. Since the invention involves only a few components, the advantages of the transceiver according to the invention include small size and low power consumption.

BRIEF DESCRIPTION OF THE DRAWING

The invention will now be described in more detail with reference to the accompanying drawing wherein.

DETAILED DESCRIPTION OF THE INVENTION

Figure 1:
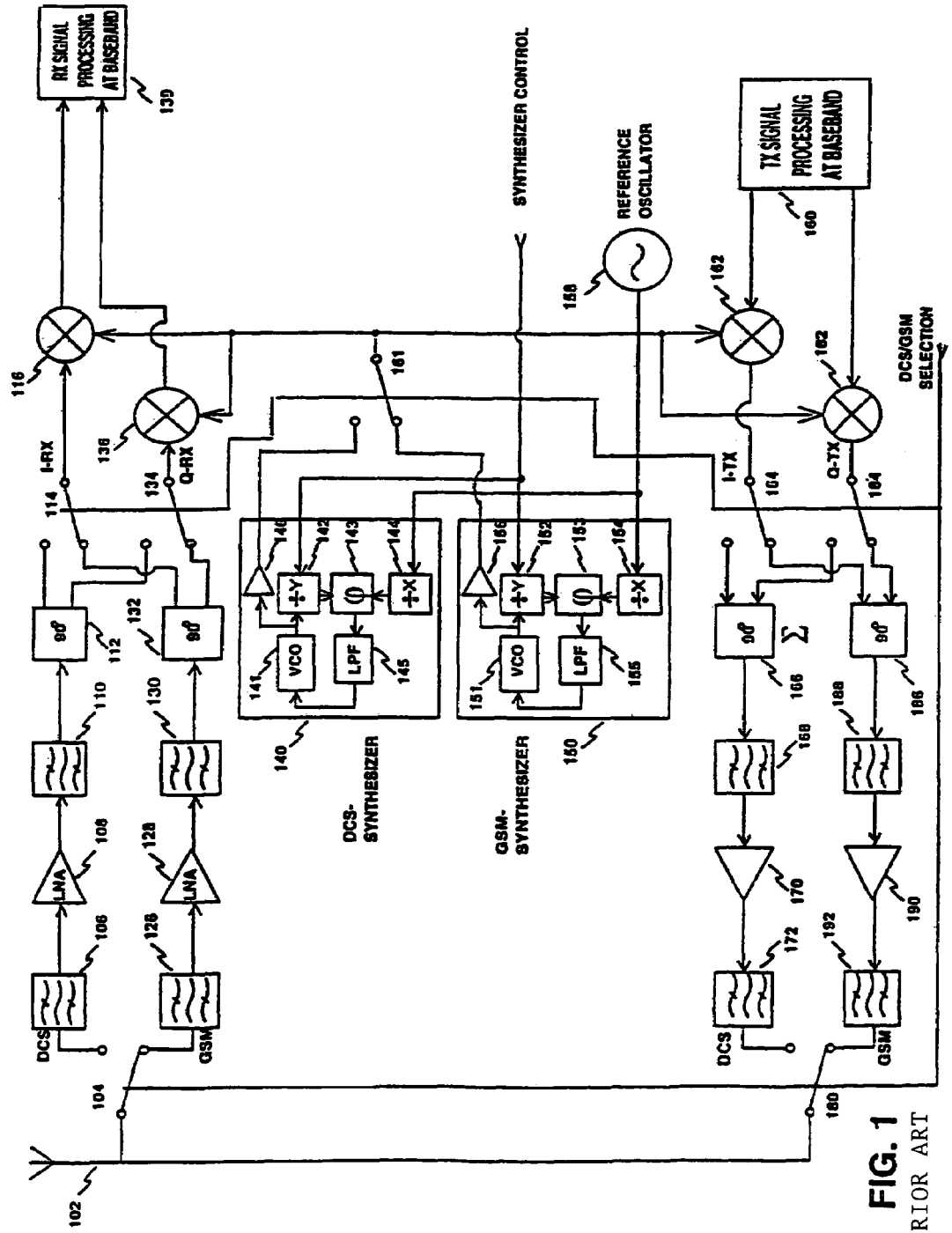
FIG. 1 shows a block diagram of a dual-band direct-conversion transceiver according to the prior art.

FIG. 1 was already discussed in conjunction with the description of the prior art. Next, a transceiver according to the invention will be described, referring to FIG. 2.

Figure 2:
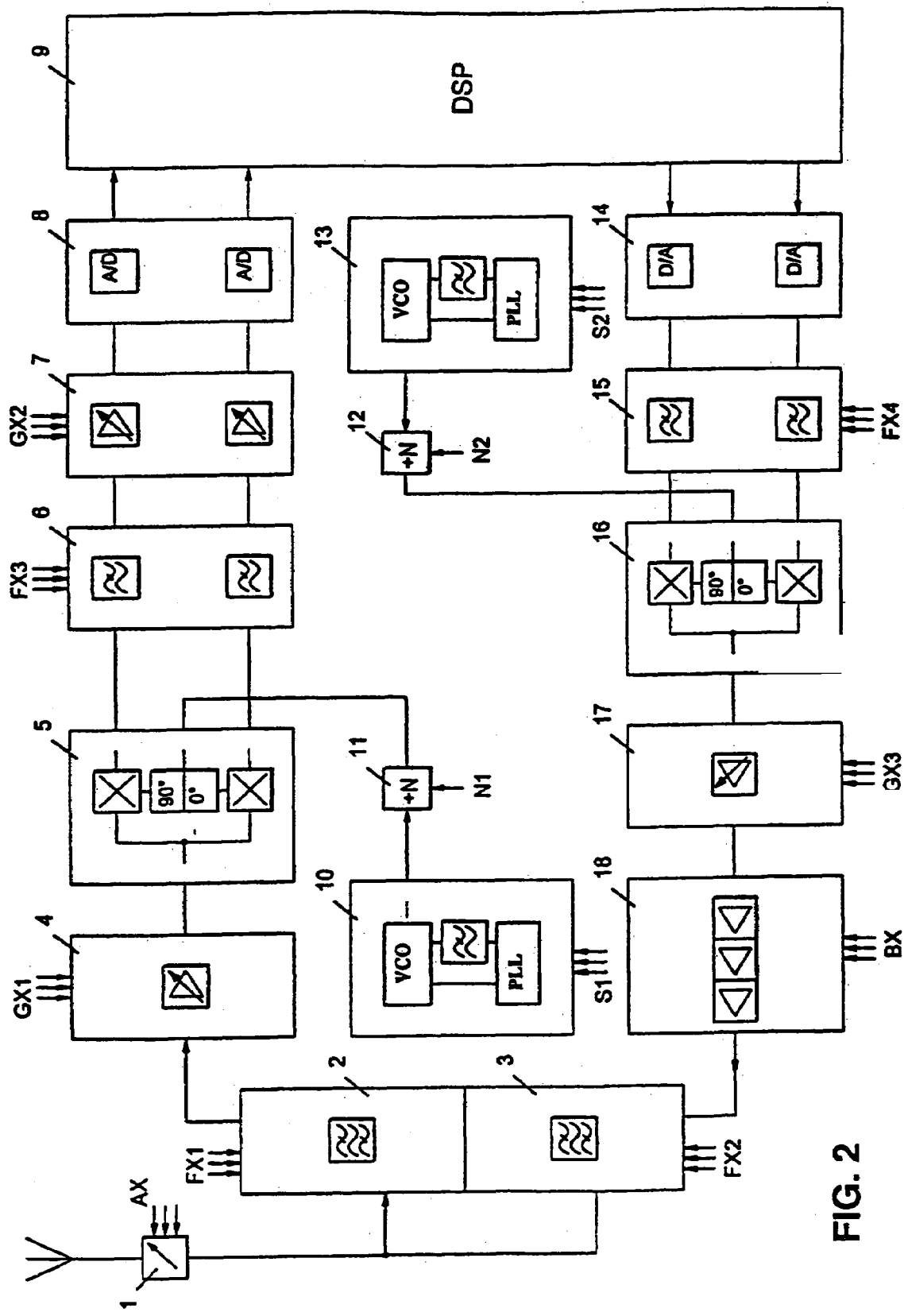
FIG. 2 shows in the form of block diagram a solution according to the invention for a direct-conversion transceiver operating in multiple systems.

FIG. 2 shows in the form of block diagram a transceiver according to the invention. A RF signal received through an antenna is conducted via matching circuits 1 to controllable bandpass filters 2. The matching circuits 1 may advantageously be controllable (AX) with respect to the operating frequency band. A controllable bandpass filter 2 may be advantageously realized using a plurality of bandpass filters so that the RF signal is conducted via switch elements controlled by a control signal FX1 from the matching circuit 1 to the bandpass filter that corresponds to the selected operating frequency band. The bandpass filter may also be realized so as to be adjustable and tuneable by means of programming. The bandpass filtered carrier-frequency signal is further conducted to a low-noise amplifier 4, the gain of which is advantageously controllable. The control signal is marked GX1 in the drawing. In addition to amplifier 4, it is also possible to have integrated amplifiers in connection with the bandpass filters.

The signal is then conducted to a mixer 5 in which the carrier-frequency signal is mixed with an RX mixing signal at the receive frequency to produce a baseband quadrature signal. The RX mixing signal is advantageously generated by a synthesizer 10 the output signal frequency of which is divided by a divider 11 so as to correspond to the selected receive frequency. The synthesizer 10 operates in a similar manner as the synthesizers depicted in FIG. 1. Thus it comprises a voltage-controlled oscillator VCO which produces an output signal. The frequency of the VCO output signal is divided by S1 in a divider in the phase-locked loop PLL. The resulting signal is conducted to a first input of a phase comparator in the phase-locked loop. Similarly, the frequency of a signal generated by a reference oscillator in the phase-locked loop PLL is divided by an integer and conducted to a second input of the phase comparator. The phase comparator produces a signal which is proportional to the phase difference of the two input signals and conducted to a low-pass filter, and the filtered signal then controls the voltage-controlled oscillator VCO. The output frequency is controlled by varying the divisor S1.

The synthesizer output signal is divided in divider 11 by N1 so that the RX mixing signal corresponds to the selected receive frequency band. The output frequency of the synthesizer may be e.g. in the 4-GHz band, so that with 2-GHz systems the synthesizer output frequency is divided by two, and with 1-GHz systems it is divided by four (N1). This way, systems operating in the 1-GHz and 2-GHz bands can be covered with a synthesizer the operating frequency band of which is narrow with respect to the operating frequency.

To produce a quadrature baseband signal the mixer needs two mixing signals with a phase shift of 90 degrees. Phase-shifted components may be produced by a phase shifter in connection with the mixer or they may be produced as quotients generated already in the frequency divider 11, thus achieving an accurate phase difference. Therefore, it is advantageous to use a synthesizer operating frequency which is a multiple of the highest system frequency.

The in-phase component I and quadrature component Q from the mixer 5 are further conducted to low-pass filters 6. The higher cut-off frequency of the low-pass filters is advantageously controllable with control signal FX3. Thus the filtering can be performed at a bandwidth corresponding to the selected radio interface, and since the filtering is performed at baseband, it is easy to get the filtering function steep. Also, no strict demands are set on the bandpass filtering (2) of the RF signal.

The baseband signal is further conducted to a gain control block 7 which possibly includes an offset voltage correction block. On the other hand, considering the broad bandwidth of the CDMA system, the offset voltage can easily be removed by high-pass filtering. The amplifier advantageously realizes automatic gain control (AGC). Finally, the signal is converted digital in an analog-to-digital converter 8, and the digital baseband signal is further processed in a digital signal processor (DSP) 9. Channel filtering may also be performed digitally in the DSP, whereby the low-pass filtering of the baseband signal may be performed using a fixed cut-off frequency. Then, however, the dynamics of the analog-to-digital converter must be considerably better.

In the transmitter part, a quadrature baseband signal is first digitally generated in block 9 on the basis of the information signal to be sent. The components of the digital signal are converted analog by digital-to-analog converters 14, whereafter the analog signals are low-pass filtered by low-pass filters 15. Advantageously, the cut-off frequency of the low-pass filters can be controlled with control signal FX4 so as to correspond to the specifications of the selected radio interface.

A TX mixing signal at the carrier frequency is generated by a synthesizer 13 and divider 12. The synthesizer 13 operates in a similar manner as the synthesizer 10 in the receiver part. Moreover, the synthesizers may share a reference oscillator. The frequency of the synthesizer output signal is controlled with control signal S2 within the synthesizer's operating frequency range. The frequency of the output signal from synthesizer 13 is divided in divider 12 so as to correspond to the selected transmission frequency band. Components phase-shifted by 90 degrees are generated from the TX mixing signal in order to perform complex mixing in mixer 16. The phase-shifted components may be generated in the same way as in the receiver part.

The signal at the carrier frequency is then amplified in an amplifier 17, the gain of which is advantageously controllable in order to set the transmission power and realize automatic gain control (AGC). The control signal is marked GX3 in FIG. 2. The signal is then conducted to a power amplifier 18. The operating frequency band of the power amplifier is advantageously selectable with control signal BX. This can be achieved e.g. such that the amplifier comprises partly separate signal lines for the different operating frequency bands.

The RF signal generated is filtered by a bandpass filter 3. The pass band of the bandpass filter is advantageously controllable with control signal FX2. This can be realized in the same way as in the receiver part. The receiver and transmitter part filters 2 and 3 are advantageously realized in duplex filter pairs for each transmit-receive frequency band associated with a given system. The filters may advantageously be surface acoustic wave (SAW) or bulk acoustic wave (BAW) filters so that several filters with their switches may be attached to one component.

The control signals in the mobile station transceiver according to FIG. 2 are preferably generated in a control block of the mobile station which advantageously comprises a processing unit such as a microprocessor. The control block generates the signal on the basis of a system switch instruction input from the keypad of the mobile station, for example. System selection may be e.g. menu-based so that the desired system is selected by choosing it from a displayed menu by pressing a certain key on the keypad. The control block then generates the control signals that correspond to the selected system. The system switch instruction may also come via the mobile communication system in such a manner that data received from the system may include a system switch instruction on the basis of which the control block performs the system switch. Advantageously, a control program is stored in a memory unit used by the control block, which control program monitors the received data and, as it detects a system switch instruction in the data, gives the control block an instruction to set the control signals into states according to the selection instruction.

The implementation of the blocks described above is not illustrated in more detail as the blocks can be realized on the basis of the information disclosed above, applying the usual know-how of a person skilled in the art.

Above it was described embodiments of the solution according to the invention. Naturally, the principle according to the invention may be modified within the scope of the invention as defined by the claims appended hereto, e.g. as regards implementation details and fields of application. It is especially noteworthy that the solution according to the invention may be well applied to communication systems other than the mobile communication systems mentioned above. Apart from the cellular radio interface proper, the solution may be used to realize e.g. a GPS receiver for the location of a mobile station or other apparatus. Furthermore, the operating frequencies mentioned are given by way of example only, and the implementation of the invention is in no way restricted to them.

It is also noteworthy that the solution according to the invention may be applied to all current coding techniques such as the narrow-band FDMA (Frequency Division Multiple Access) and TDMA (Time Division Multiple Access), as well as the broadband CDMA (Code Division Multiple Access) technique. In addition, the solution according to the invention may be used to realize an FM (Frequency Modulation) receiver.

Below is a table listing some of the so-called second generation mobile communication systems to which the present invention may be applied. The table shows the most important radio interface related characteristics of the systems.

| CELLULAR SYSTEM | AMPS | IS-54/-136 | IS-95 US CDMA | GSM Global System for Mobile Communications | DCS 1800 | PDC Personal Digital Cellular | DECT Digital European Cordless Telephone | PHS Personal Handy Phone System |
|---|---|---|---|---|---|---|---|---|
| RX FREQ. (MHz) | 869-894 | 869-894 | 869-894 | 935-960 | 1805-1880 | 810-826, 1429-1453 | 1880-1900 | 1895-1918 |
| TX FREQ. (MHz) | 824-849 | 824-849 | 824-849 | 890-915 | 1710-1785 | 940-956, 1477-1501 | 1880-1900 | 1895-1918 |
| RF BANDWIDTH | 25 MHz | 25 MHz | 25 MHz | 25 MHz | 75 MHz | 16 MHz 24 MHz | 20 MHz | 23 MHz |
| MULTIPLE ACCESS METHOD | FDMA | TDMA/ FDMA | CDMA/FDMA | TDMA/FDMA | TDMA/ FDMA | TDMA/FDMA | TDMA/ FDMA | TDMA/ FDMA |
| DUPLEX METHOD | FDD | FDD | FDD | FDD | FDD | FDD | TDD | TDD |
| NUMBER OF CHANNELS | 832 | 832, 3 users/channel | 20, 798 users/channel | 124, 8 users/channel | 374, 8 users/channel | 1600, 3 users/channel | 10, 12 users/channel | 300 4 users/channel |
| CHANNEL SPACING | 30 kHz | 30 kHz | 1250 kHz | 200 kHz | 200 kHz | 25 kHz | 1.728 MHz | 300 kHz |
| MODULATION | FM | $\pi/4$ DQPSK | QPSK/ OQPSK | GMSK 0.3 Gaussian filter | GMSK 0.3 Gaussian filter | $\pi/4$ DQPSK | GFSK 0.3 Gaussian filter | $\pi/4$ DQPSK |
| CHANNEL BIT RATE | — | 48.6 kb/s | 1.2288 Mb/s | 270.833 kb/s | 270.833 kb/s | 42 kb/s | 1.152 Mb/s | 384 kb/s |

Below is another table listing some of the so-called third generation mobile communication systems to which the present invention may be applied. The table shows the most important radio interface related characteristics of the systems.

| CELLULAR SYSTEM | WCDMA | |
|---|---|---|
| RX FREQ. (MHz) | 2110-2170 | 1900-1920 |
| TX FREQ. (MHz) | 1920-1980 | 1900-1920 |
| MULTIPLE ACCESS METHOD | CDMA | TDMA |
| DUPLEX METHOD | FDD | TDD |
| CHANNEL SPACING | 5 MHz | 5 MHz |
| MODULATION | QPSK | |
| CHANNEL BIT RATE | 144 kb/s in rural outdoor, 500 kb/s in urban outdoor and up to 2 Mb/s in indoor | |

What is claimed is:

1. A method for processing signals received from different radio interfaces of communication systems, comprising steps in which:

a carrier-frequency signal is received from a radio interface, the signal at the carrier frequency is bandpass-filtered, the filtered signal at the carrier frequency is amplified, a RX mixing signal at a receive frequency is generated, a complex baseband signal is generated from the received carrier-frequency signal by mixing it with the RX mixing signal, the baseband signal generated is low-pass filtered, the baseband signal generated is amplified or attenuated prior to analog-to-digital conversion, the baseband signal is converted to digital, and the baseband signal converted to digital is processed so as to produce an information signal encoded and modulated into the received carrier-frequency signal, wherein said amplifying of the carrier frequency signal is performed with one and the same amplifier for signals received from at least two different radio interfaces, and a gain of said amplifier is set with a program-controlled gain control signal in relation to the radio interface from which signals are received, said generating of the complex baseband signal is performed with one and the same mixer for signals received from at least two different radio interfaces, said RX mixing signal is generated with a frequency synthesizer, and an output frequency of said frequency synthesizer is selected with a program-controlled frequency selection signal in relation to the radio interface from which signals are received, and said bandpass-filtering is performed using a pass band selected with a program-controlled pass-band selection signal in relation to the radio interface from which signals are received.

2. A method for processing signals for transmission to different radio interfaces of communication systems, comprising steps in which:

a digital baseband quadrature signal is generated on the basis of an information signal to be transmitted, the digital baseband quadrature signal is converted to analog, a TX mixing signal at a transmit frequency is generated, a carrier-frequency transmission signal is generated from the analog baseband quadrature signal by mixing the analog baseband quadrature signal with the TX mixing signal, the carrier-frequency transmission signal generated is amplified, and the amplified carrier-frequency transmission signal is transmitted to one of the radio interfaces, wherein said generating of a TX mixing signal at the transmit frequency comprises for at least one radio interface dividing a frequency of an output signal generated by a TX synthesizer, and said output signal of said TX synthesizer is selected with a program-controlled frequency selection signal in relation to the radio interface to which the amplified carrier-frequency transmission signal is transmitted, said generating of the carrier-frequency signal is performed with one and the same mixer for signals to be transmitted to at least two different radio interfaces, and said amplifying of the carrier frequency signal is performed with one and the same amplifier for signals to be transmitted to at least two different radio interfaces, and a gain of said amplifier is set with a program-controlled gain control signal in relation to the radio interface to which the amplified carrier-frequency transmission signal is transmitted.

3. A direct-conversion receiver operating at different radio interfaces of communication systems, comprising:

antenna means for receiving a carrier-frequency signal from a radio interface, a bandpass filter for filtering the carrier-frequency signal, a first receiver amplifier for amplifying the filtered carrier-frequency signal, means for generating a RX mixing signal at a receive frequency, mixing means for generating a complex baseband signal from the received signal by means of the RX mixing signal, a low-pass filter for filtering the baseband signal, a second amplifier for amplifying the baseband signal, an analog-to-digital converter for converting the baseband signal to digital, and means for processing the baseband signal converted to digital so as to produce an information signal encoded and modulated into the received signal, wherein said first receiver amplifier is common for amplifying signals received from at least two different radio interfaces and comprises a gain control input for receiving a program-controlled gain control signal adapted to set the gain of said first receiver amplifier in relation to the radio interface from which signals are received, said mixing means for generating the complex baseband signal is common for processing signals received from at least two different radio interfaces, said means for generating a RX mixing signal comprises an output frequency selection input for receiving a program-controlled output frequency selection signal adapted to select the output frequency of said means for generating a RX mixing signal in relation to the radio interface from which signals are received, and said bandpass-filter comprises a pass band selection input for receiving a program-controlled pass band selection signal adapted to select a pass band of said band pass filter in relation to the radio interface from which signals are received.

4. The receiver of claim 3, wherein the means for generating a mixing signal at the receive frequency comprises an RX synthesizer and controllable frequency divider for dividing the frequency of the output signal generated by the RX synthesizer.

5. The receiver of claim 4, wherein said frequency divider is arranged so as to divide the output signal of the RX synthesizer always by at least two in order to generate an RX mixing signal.

6. The receiver of claim 3, further comprising means for controlling the cut-off frequency of low-pass filtering in order to perform channel filtering according to the selected radio interface.

7. The receiver of claim 3, further comprising means for implementing channel filtering realized in a digital manner.

8. The receiver of claim 3, further comprising means for controlling the gain of the second amplifier.

9. The receiver of claim 3, wherein the signal processing path comprises substantially the same components for connecting to the different radio interfaces.

10. A direct-conversion transmitter operating at different radio interfaces of communication systems, comprising:

means for generating a digital baseband quadrature signal on the basis of an information signal to be transmitted, means for implementing channel filtering realized in a digital manner, a digital-to-analog converter for converting the digital baseband quadrature signal to analog, a controllable low-pass filter for filtering the analog baseband transmission signal in order to perform channel filtering according to the radio interface selected, a synthesizer for generating a TX mixing signal at a transmit frequency, mixing means for producing a signal at a carrier frequency from the filtered analog baseband transmission signal by means of the TX mixing signal, an amplifier for amplifying the signal at the carrier frequency, and antenna means for transmitting the amplified transmission signal at the carrier frequency, wherein the synthesizer for generating a TX mixing signal at the transmit frequency comprises a TX synthesizer and controllable frequency divider for dividing the frequency of the output signal generated by the TX synthesizer, as well as an output frequency selection input for receiving a program-controlled output frequency selection signal adapted to select the output frequency of said synthesizer for generating a TX mixing signal according to the radio interface selected, said mixing means for producing a carrier frequency signal is common for processing signals for transmission in at least two different radio interfaces, and said transmitter amplifier is common for amplifying carrier frequency signals for transmission to at least two different radio interfaces and comprises a gain control input for receiving a program-controlled gain control signal adapted to set the gain of said transmitter amplifier according to the radio interface selected.

11. The transmitter of claim 10, wherein said frequency divider is arranged so as to divide the TX synthesizer's output signal always at least by two in order to generate a TX mixing signal.

12. The transmitter of claim 10, further comprising a power amplifier section in said amplifier, and a control input for receiving a control signal to said power amplifier section for controlling the operating frequency band of the power amplifier.

13. The transmitter of claim 10, further comprising a bandpass filter for filtering the amplified transmission signal at the carrier frequency, and means for selecting the pass band of the transmitter bandpass filter so that it corresponds to the transmission frequency.

14. The transmitter of claim 10, wherein the signal processing path comprises substantially the same components for connecting to the different radio interfaces.

15. Direct-conversion receiver circuitry for operating in different radio communication systems, comprising:
- a first receiver amplifier adapted to amplify a filtered carrier-frequency signal,
- a frequency synthesizer adapted to generate a RX mixing signal at a receive frequency,
- a mixer adapted to generate a complex baseband signal from the amplified filtered carrier-frequency signal by mixing with the RX mixing signal,
- a second amplifier adapted to amplify the baseband signal,
- an analog-to-digital converter adapted to convert the amplified baseband signal to digital, and
- a coupling from the analog-to-digital converter to a digital signal processor adapted to process the baseband signal converted to digital so as to produce an information signal encoded and modulated into the received signal;

wherein said first receiver amplifier is common for amplifying signals received from at least two different radio communication systems and comprises a gain control input for receiving a program-controlled gain control signal adapted to set the gain of said first receiver amplifier in relation to the radio communication system from which signals are received, wherein said mixer is common for processing signals received from at least two different radio communication systems, and wherein said frequency synthesizer comprises an output frequency selection input for receiving a program-controlled output frequency selection signal adapted to select the output frequency of said frequency synthesizer adapted to generate a RX mixing signal in relation to the radio communication system from which signals are received.

16. Direct-conversion receiver circuitry according to claim 15, additionally comprising a bandpass filter adapted to filter a carrier-frequency signal to produce said filtered carrier-frequency signal, said bandpass filter comprising a pass band selection input for receiving a program-controlled pass band selection signal adapted to select a pass band of said band pass filter in relation to the radio communication system from which signals are received.

17. Direct-conversion receiver circuitry according to claim 15, additionally comprising a low-pass filter between said mixer and said second amplifier, said low-pass filter being adapted to filter the complex baseband signal.

18. Direct-conversion transmitter circuitry for operating in different radio communication systems, comprising:
- an input for receiving a digital baseband quadrature signal representing an information signal to be transmitted,
- a digital-to-analog converter adapted to convert the digital baseband quadrature signal to analog,
- a frequency synthesizer adapted to generate a TX mixing signal at a transmit frequency,
- a mixer adapted to produce a signal at a carrier frequency from the analog baseband quadrature signal by mixing with the TX mixing signal,
- an amplifier adapted to amplify the signal at the carrier frequency, and
- an output for transmitting the amplified signal at the carrier frequency;

wherein the frequency synthesizer comprises a TX synthesizer and controllable frequency divider for dividing the frequency of the output signal generated by the TX synthesizer, as well as an output frequency selection input for receiving a program-controlled output frequency selection signal adapted to select the output frequency of said frequency synthesizer according to the radio communication system selected, wherein said mixer is common for processing signals for transmission in at least two different radio communication systems, and wherein said transmitter amplifier is common for amplifying carrier frequency signals for transmission to at least two different radio communication systems and comprises a gain control input for receiving a program-controlled gain control signal adapted to set the gain of said transmitter amplifier according to the radio communication system selected.

19. Direct-conversion transmitter circuitry according to claim 18, additionally comprising a controllable low-pass filter between the digital-to-analog converter and the mixer, said controllable low-pass filter being adapted to filter the analog baseband quadrature signal in order to perform channel filtering according to the radio communication system selected.

20. A direct-conversion receiver for operating in different radio communication systems, comprising:
- an antenna adapted to receive a carrier-frequency signal from a radio communication system,
- a bandpass filter adapted to filter the carrier-frequency signal,
- a first receiver amplifier adapted to amplify the filtered carrier-frequency signal,
- a frequency synthesizer adapted to generate a RX mixing signal at a receive frequency,
- a mixer adapted to generate a complex baseband signal from the amplified filtered carrier-frequency signal by mixing with the RX mixing signal,
- a low-pass filter adapted to filter the complex baseband signal,
- a second amplifier adapted to amplify the filtered complex baseband signal,
- an analog-to-digital converter adapted to convert the amplified filtered baseband signal to digital, and
- a digital signal processor adapted to process the baseband signal converted to digital so as to produce an information signal encoded and modulated into the received signal;

wherein said first receiver amplifier is common for amplifying signals received from at least two different radio communication systems and comprises a gain control input for receiving a program-controlled gain control signal adapted to set the gain of said first receiver amplifier in relation to the radio communication system from which signals are received, wherein said mixer is common for processing signals received from at least two different radio communication systems, wherein said frequency synthesizer comprises an output frequency selection input for receiving a program-controlled output frequency selection signal adapted to select the output frequency of said frequency synthesizer in relation to the radio communication system from which signals are received, and wherein said bandpass filter comprises a pass band selection input for receiving a program-controlled pass band selection signal adapted to select a pass band of said band pass filter in relation to the radio communication system from which signals are received.

21. A direct-conversion transmitter for operating in different radio communication systems, comprising:

a digital signal processor adapted to produce a digital baseband quadrature signal representing an information signal to be transmitted, a digital-to-analog converter adapted to convert the digital baseband quadrature signal to analog, a controllable low-pass filter adapted to filter the analog baseband quadrature signal in order to perform channel filtering according to the radio communication system selected, a frequency synthesizer adapted to generate a TX mixing signal at a transmit frequency, a mixer adapted to produce a signal at a carrier frequency from the analog baseband quadrature signal by mixing with the TX mixing signal, an amplifier adapted to amplify the signal at the carrier frequency, and an antenna for transmitting the amplified signal at the carrier frequency;

wherein the frequency synthesizer comprises a TX synthesizer and controllable frequency divider for dividing the frequency of the output signal generated by the TX synthesizer, as well as an output frequency selection input for receiving a program-controlled output frequency selection signal adapted to select the output frequency of said frequency synthesizer according to the radio communication system selected, wherein said mixer is common for processing signals for transmission in at least two different radio communication systems, and wherein said transmitter amplifier is common for amplifying carrier frequency signals for transmission to at least two different radio communication systems and comprises a gain control input for receiving a program-controlled gain control signal adapted to set the gain of said transmitter amplifier according to the radio communication system selected.

22. A device for wireless communications, for operating in different radio communication systems, comprising:

an antenna adapted to receive a carrier-frequency signal from a radio communication system, a bandpass filter adapted to filter the carrier-frequency signal, a first receiver amplifier adapted to amplify the filtered carrier-frequency signal, a frequency synthesizer adapted to generate a RX mixing signal at a receive frequency, a mixer adapted to generate a complex baseband signal from the amplified filtered carrier-frequency signal by mixing with the RX mixing signal, a low-pass filter adapted to filter the complex baseband signal, a second amplifier adapted to amplify the filtered complex baseband signal, an analog-to-digital converter adapted to convert the amplified filtered baseband signal to digital, and a digital signal processor adapted to process the baseband signal converted to digital so as to produce an information signal encoded and modulated into the received signal;

wherein said first receiver amplifier is common for amplifying signals received from at least two different radio communication systems and comprises a gain control input for receiving a program-controlled gain control signal adapted to set the gain of said first receiver amplifier in relation to the radio communication system from which signals are received, wherein said mixer is common for processing signals received from at least two different radio communication systems, wherein said frequency synthesizer comprises an output frequency selection input for receiving a program-controlled output frequency selection signal adapted to select the output frequency of said frequency synthesizer in relation to the radio communication system from which signals are received, and wherein said bandpass filter comprises a pass band selection input for receiving a program-controlled pass band selection signal adapted to select a pass band of said band pass filter in relation to the radio communication system from which signals are received.

23. A device for wireless communications, for operating in different radio communication systems, comprising:

a digital signal processor adapted to produce a digital baseband quadrature signal representing an information signal to be transmitted, a digital-to-analog converter adapted to convert the digital baseband quadrature signal to analog, a controllable low-pass filter adapted to filter the analog baseband quadrature signal in order to perform channel filtering according to the radio communication system selected, a frequency synthesizer adapted to generate a TX mixing signal at a transmit frequency, a mixer adapted to produce a signal at a carrier frequency from the analog baseband quadrature signal by mixing with the TX mixing signal, an amplifier adapted to amplify the signal at the carrier frequency, and an antenna for transmitting the amplified signal at the carrier frequency;

wherein the frequency synthesizer comprises a TX synthesizer and controllable frequency divider for dividing the frequency of the output signal generated by the TX synthesizer, as well as an output frequency selection input for receiving a program-controlled output frequency selection signal adapted to select the output frequency of said frequency synthesizer according to the radio communication system selected, wherein said mixer is common for processing signals for transmission in at least two different radio communication systems, and wherein said transmitter amplifier is common for amplifying carrier frequency signals for transmission to at least two different radio communication systems and comprises a gain control input for receiving a program-controlled gain control signal adapted to set the gain of said transmitter amplifier according to the radio communication system selected.

* * * * *